United States Patent
Baumgart et al.

(10) Patent No.: US 7,907,217 B2
(45) Date of Patent: Mar. 15, 2011

(54) SYSTEMS AND METHODS OF SUBTRACTION ANGIOGRAPHY UTILIZING MOTION PREDICTION

(75) Inventors: John Baumgart, Hoffman Estates, IL (US); Florian Vogt, Effeltrich (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1077 days.

(21) Appl. No.: 11/622,736

(22) Filed: Jan. 12, 2007

(65) Prior Publication Data

US 2008/0101670 A1 May 1, 2008

Related U.S. Application Data (60) Provisional application No. 60/863,629, filed on Oct. 31, 2006.

(51) Int. Cl.
H04N 5/14 (2006.01)
(52) U.S. Cl. .......................... 348/699; 382/128; 382/236
(58) Field of Classification Search .................. 348/699
See application file for complete search history.

(56) References Cited

U.S. PATENT DOCUMENTS

| | | | | |
|---|---|---|---|---|
| 4,558,462 A * | 12/1985 | Horiba et al. | ................ | 382/275 |
| 4,870,692 A | 9/1989 | Zuiderveld et al. | | |
| 5,067,014 A * | 11/1991 | Bergen et al. | ................ | 382/107 |
| 5,614,945 A * | 3/1997 | Sekine et al. | ............ | 348/207.99 |
| 5,689,283 A | 11/1997 | Shirochi | | |
| 5,734,738 A * | 3/1998 | Sato | ............................. | 382/128 |
| 5,786,860 A * | 7/1998 | Kim et al. | ................ | 375/240.15 |
| 5,835,138 A * | 11/1998 | Kondo | .................... | 348/207.99 |
| 6,249,612 B1 * | 6/2001 | Ogura | ........................... | 382/236 |
| 6,380,986 B1 * | 4/2002 | Minami et al. | ................ | 348/699 |
| 6,879,094 B2 | 4/2005 | Choi | | |
| 7,006,157 B2 * | 2/2006 | Sohn | ............................ | 348/699 |
| 7,733,960 B2 * | 6/2010 | Kondo et al. | ............ | 375/240.16 |
| 2003/0215014 A1 * | 11/2003 | Koto et al. | ............... | 375/240.16 |
| 2004/0057515 A1 * | 3/2004 | Koto et al. | ............... | 375/240.14 |
| 2004/0136461 A1 * | 7/2004 | Kondo et al. | ............ | 375/240.16 |
| 2004/0146109 A1 * | 7/2004 | Kondo et al. | ............ | 375/240.16 |
| 2010/0277649 A1 * | 11/2010 | Conklin | ....................... | 348/699 |

OTHER PUBLICATIONS

Erik Meijering et al., "Motion Correction in Digital Subtraction Angiography", Image Sciences Institute, 2006.

(Continued)

*Primary Examiner* — Sath V Perungavoor
(74) *Attorney, Agent, or Firm* — Alexander J Burke (57) ABSTRACT

A system and method for calculating a pixel-shift vector that predicts the motion in dynamic image data and can be used to shift reference image data in order to generate a subtracted image with reduced motion artifacts. The pixel-shift vector is calculated based on displacement vectors that have been calculated based on past motion in the dynamic image data. One embodiment determines a virtual pixel-shift vector as a function of stored pixel-shift vectors that were previously determined as a function of a previously captured live frame. The virtual pixel-shift vector is a prediction of the location of the current live frame before the current live frame is captured. The mask frame is adjusted as a function of this virtual pixel-shift vector. The current live frame is then subtracted from the mask frame adjusted as a function of the virtual pixel-shift vector. The adjusted mask frame and the live frame will then overlap and the subtracted image will have reduced artifacts.

26 Claims, 9 Drawing Sheets

OTHER PUBLICATIONS

Robert A. Pooley et al., "The AAPM/RSNA Physics Tutorial for Residents—Digital Fluoroscopy", Imaging & Therapeutic Technology, Mar.-Apr. 2001, vol. 21, No. 2, pp. 521-534.

Erik Meijering et al., "Retrospective Motion Correction in Digital Subtraction Angiography: A Review". IEEE Transactions on Medical Imaging, vol. 16, No. 1, Jan. 1999, pp. 2-37.

Arbee Chen et al., "Content-based Video Data Retrieval", Proc. Natl Sci. Counc. ROC(A), vol. 23, No. 4, 1999, pp. 449-465.

* cited by examiner

SYSTEMS AND METHODS OF SUBTRACTION ANGIOGRAPHY UTILIZING MOTION PREDICTION

CROSS-REFERENCE TO RELATED APPLICATIONS

This application claims a priority benefit to provisional application Ser. No. 60/863,629, filed on Oct. 31, 2006 and entitled "Auto-Pixel Shift Calculation With Motion Prediction for Subtracted Angiography," which is hereby incorporated by reference in its entirety herein.

BACKGROUND

1. Field of the Invention

This invention relates generally to digital image correction. More specifically, the present invention relates to reducing motion artifacts in a subtracted image. In particular, the present invention is directed to a method for calculating a pixel-shift vector that predicts the motion in dynamic image data and can be used to shift reference image data in order to generate a subtracted image with reduced motion artifacts.

2. Background Discussion

In digital subtraction angiography, contrast medium is injected into blood vessels and real-time subtraction of pre- and post-contrast images is performed. Typically, when reference image data (pre-contrast) and dynamic image data (post-contrast) are subtracted from one another, the resultant subtracted image contains motion artifacts. These motion artifacts result from motion in the dynamic image data which causes the dynamic image data to shift relative to the reference image data.

Movement by the doctor, patient, or equipment may cause the live frame to shift from the position it was in when the reference or mask frame was captured. Subtracting the shifted live frame from the roadmap mask will result in artifacts in the subtracted image. Conventional methods attempt to reduce artifacts by shifting the mask frame using a pixel-shift vector determined as a function of a previously captured live frame and the mask frame. While this approach may reduce artifacts to an extent, it will also lag behind the actual motion in the live frame.

Conventional techniques attempt to overcome motion artifacts in subtracted angiography images by shifting the mask frame (pre-contrast) using a vector that has been calculated based on a past frame of the x-ray image. Two such conventional methods are described in U.S. Pat. No. 4,558,462 issued to Horiba et al. and U.S. Pat. No. 4,870,692 issued to Zuiderveld et al., which are both incorporated by reference in their entirety herein. However, if the motion in the current frame of the x-ray image differs from the motion in the past frame of the x-ray image from which the displacement vector was calculated, then the displacement vector will not be correct for the current x-ray image and artifacts will still result in the subtracted image.

Therefore, it would be an advancement in the state of the art to provide a system and method of calculating a pixel-shift vector that adjusts the reference image data of the current frame of the live x-ray image based on previously calculated pixel-shift vectors.

It would also be an advancement in the state of the art to provide improved reduction in motion artifacts in a resultant image.

It would also be an advancement in the state of the art to increase the clarity of the subtracted image in a digital subtraction angiography.

SUMMARY

Thus, the present invention is directed to systems and methods of auto-pixel shift calculation with motion prediction for subtracted angiography. One aspect of the present invention relates to predicting motion in a live frame during digital subtraction angiography in order to reduce artifacts in the subtracted image.

The present invention may be implemented by determining a virtual pixel-shift vector as a function of stored pixel-shift vectors that were previously determined as a function of a previously captured live frame. The virtual pixel-shift vector is a prediction of the location of the current live frame before the current live frame is captured. The mask frame is adjusted as a function of this virtual pixel-shift vector. The current live frame is then subtracted from the mask frame adjusted as a function of the virtual pixel-shift vector. The adjusted mask frame and the live frame will then overlap and the subtracted image will have reduced artifacts. A resultant image may then be generated.

Accordingly, one embodiment of the present invention is directed to a method for adjusting reference image data by applying a pixel-shift vector that is calculated as a function of previously obtained pixel-shift vectors. This method (hereinafter, "the method") includes accessing reference image data and first dynamic image data. First pixel-shift vector data is determined as a function of the reference image data and the first dynamic image data. Second dynamic image data is accessed. Second pixel-shift vector data is determined as a function of the reference image data and the second dynamic image data. Third pixel-shift vector data is determined as a function of the first pixel-shift vector data and the second pixel-shift vector data. The reference image data is adjusted as a function of the third pixel-shift vector data. Third dynamic image data is accessed. The third dynamic image data is subtracted from the adjusted reference image data and resultant image data is generated as a function of the subtracting step.

Another embodiment of the present invention is directed to the method described above and also includes storing the resultant image data.

Yet another embodiment of the present invention is directed to the method described above wherein the resultant image data is displayed.

Yet another embodiment of the present invention is directed to the method described above and also includes determining the first pixel-shift vector data at a predetermined frame rate of the first dynamic image data.

Yet another embodiment of the present invention is directed to the method described above and also includes adjusting the reference image data as a function of the second pixel-shift vector data.

Yet another embodiment of the present invention is directed to the method described above wherein the reference image data is a first frame of data and the first dynamic image data is a subsequent frame of data.

Yet another embodiment of the present invention is directed to the method described above wherein the reference image data is a mask frame.

Yet another embodiment of the present invention is directed to a method for calculating virtual pixel-shift vector data based on previously calculated pixel-shift vector data, which was obtained as a function of reference frame data and dynamic frame data. A reference frame and dynamic frame data are accessed. Pixel-shift vector data is calculated as a function of the reference fame and dynamic frame data. Virtual pixel-shift vector data is calculated as a function of the pixel-shift vector data. The reference image is shifted as a function of the virtual pixel-shift vector data.

Yet another embodiment of the present invention is directed to the method described above and also including accessing second dynamic image data. Second dynamic frame data is accessed. The second dynamic frame data is subtracted from the shifted reference frame. Resultant image data is generated as a function of the subtracting step.

Yet another embodiment of the present invention is directed to the method described above and also includes subtracting adjusted reference image data from the second dynamic image data, and generating resultant image data as a function of the subtracting step.

Yet another embodiment of the present invention is directed to the method described above and also includes determining the first pixel-shift vector data at a predetermined frame rate of dynamic image data, and determining the virtual pixel-shift vector data at a predetermined frame rate of dynamic image data.

Yet another embodiment of the present invention is directed to a method including the following steps. A reference frame and dynamic frame data are accessed. Pixel-shift vector data is calculated as a function of the reference frame and the dynamic frame data. Virtual pixel-shift vector data is calculated as a function of the pixel-shift vector data. The reference frame is shifted as a function of the virtual pixel-shift vector data. Second dynamic frame data is accessed. The second dynamic frame data is subtracted from the shifted reference frame, and resultant image data is generated as a function of the subtracting step.

Yet another embodiment of the present invention is directed to the method described above and also includes storing the pixel-shift vector data.

Yet another embodiment of the present invention is directed to the method described above wherein the pixel-shift vector data is stored in an array.

Yet another embodiment of the present invention is directed to the method described above and also includes determining the first pixel-shift vector data at a predetermined frame rate of dynamic image data.

Yet another embodiment of the present invention is directed to the method described above and also includes storing the resultant image data.

Yet another embodiment of the present invention is directed to the method described above and also includes displaying the resultant image data.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention is directed to a method for calculating a pixel-shift vector that predicts the motion in dynamic image data and can be used to shift reference image data in order to generate a subtracted image with reduced motion artifacts. The pixel-shift vector is calculated based on displacement vectors that have been calculated based on past motion in the dynamic image data.

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs. Digital subtraction angiography (DSA) is an angiographic method in which digital angiographs (with contrast medium injected) are subtracted from a reference angiograph (with no contrast medium) in order to maximize image quality and contrast of blood vessels by removing background noise. DSA is often used for road-mapping, which is a medical procedure in which a catheter or wire is inserted into a blood vessel of a patient.

Embodiments of the present invention are readily applied to fluoroscopic imaging, which utilize low dose x-rays per image but use relatively high frame rates and relatively long sequences. Fluoroscopic imaging is typically used to insert and place medical imaging conduits or other medical devices, such as catheters, wires, guide wires, stents, balloons, and other diagnostic and/or interventional apparatus, generally referred to as "medical devices" herein. Furthermore, fluoroscopic images (or roadmapping, which is a subtraction type of fluoroscopic imaging) may also be used to inject contrast media, adhesive materials, or other materials to block or fill blood vessels.

A detailed description of digital subtraction angiography, road-mapping, radiography, and x-ray imaging systems may be found in the following treatises:

Pooley, Robert A., et al. "The AARP/RSNA Physics Tutorial for Residents: Digital Fluoroscopy," *Imaging and Therapeutic Technology*, vol. 21, no. 2 (1999): pp. 521-534, which is hereby incorporated by reference in its entirety herein;

Baum, Stanley and Michael J. Pentecost, eds. *Abram's Angiography*, $4^{th}$ ed. Philadelphia: Lippincott-Raven, 1996, which is hereby incorporated by reference in its entirety herein;

Jeanne, LaBergem, ed. *Interventional Radiology Essentials*, $1^{st}$ ed. Philadelphia: Lippincott Williams & Wilkins, 2000, which is hereby incorporated by reference in its entirety herein; and Johns, Harold E. and John R. Cunningham. *Physics of Radiology*, $4^{th}$ ed. Charles C. Thomas Publisher Ltd., 1983, which is hereby incorporated by reference in its entirety herein.

One embodiment of the present invention may be applied to digital subtraction angiography and road-mapping procedures. A fluoroscope is sometimes used to generate x-ray images of the blood vessel and the catheter or wire. A video camera associated with the fluoroscope may be used to generate live x-ray video of the patient's vessel with the catheter inside. This live x-ray video may be displayed on a monitor for a doctor to see. The doctor performing the angiography may use this display to guide the catheter through the vessel.

The vessel itself, however, is often not visible on the x-ray video because it is surrounded by other bodily tissues. In order to make the vessel visible, the doctor will typically inject the vessel with a liquid known as a contrast material. As the liquid fills the vessel, the vessel becomes opaque. This opacified vessel may then be visible on the live x-ray image. Some of the bodily tissues surrounding the opacified vessel are often opaque as well. As a result, the opacified vessel is often poorly visible on the display of the live x-ray video.

Systems and methods have been developed to make the opacified vessel clearly visible. The frame of the live x-ray video having the greatest amount of vessel opacity is identified. This frame contains the opacified vessel as well as the distracting bodily structures. This frame is referred to as the mask frame. Over time, the contrast material is carried away by the blood. This results in the current frame containing only the catheter and the distracting bodily structures visible and with the blood vessel no longer visible. The current frame is then subtracted from the mask frame. The resultant frame, also referred to as a subtracted image, then contains only the opacified vessel with the catheter clearly visible inside. This result is not surprising because the mask frame contains the opacified vessel along with the distracting bodily tissues and the current frame contains the catheter and the distracting bodily tissues.

The better the fit, or overlap, between the distracting structures in the mask frame and the live frame, the more clearly the blood vessel will appear in the subtracted image. Unfortunately, the distracting bodily structures in the mask frame and the live frame will often not perfectly overlap each other. This is because, while the video camera is capturing the live x-ray images, the patient, the doctor, and the equipment are often moving. For example, during the imaging procedure, patients may move or change their position slightly or unexpectedly. Some patients may stay relatively still during an imaging procedure while other patients, such as children, may be more inclined to shift their bodies, causing the imaging procedure to become more complicated. In addition, mechanical movements (such as movement of a table supporting the patient) and unexpected movement of the imaging equipment may introduce motion from image to image. In addition there are cardiac motions due to a beating heart and respiratory motions due to breathing of the patient. This results in the current frame of the live x-ray image data being shifted from the mask frame, which is a still image taken at the time of maximum vessel opacity.

When the distracting bodily structures appear in the subtracted image as a result of movement in the live x-ray image, the resultant distracting structures in the subtracted image are referred to as motion artifacts. The greater the difference in the position between the live x-ray image and the mask fame, the worse the motion artifacts appear.

Various conventional systems and methods have been developed to attempt to reduce the severity of motion artifacts visible in the subtracted image. In a typical conventional method for reducing motion artifacts, first dynamic image data and reference image data are subtracted from one another. Displacement vectors are calculated as a function of how the first dynamic image data has moved relative to the reference image data. These displacement vectors are then applied to the reference image, causing it to shift in conformity with the first dynamic image data. Current dynamic image data is then accessed. The current dynamic image data and the shifted reference image data are then subtracted from one another. This results in a current subtracted image. Typically, using the shifted reference image instead of the original reference image results in fewer motion artifacts because the shifted reference image data is typically more similar to the position of the current dynamic image data than the original reference image data. However, because the subtraction step uses current dynamic image data and reference image data shifted to align with previously-occurring dynamic image data, motion artifacts often result despite the correction. Two such conventional methods are described in U.S. Pat. No. 4,558,462 to Horiba et al. and U.S. Pat. No. 4,870,692 to Zuiderveld et al., which are hereby incorporated by reference in their entirety herein.

Accordingly, an embodiment of the present invention is a system and method for calculating a pixel-shift vector that predicts the motion in dynamic image data and can be used to shift reference image data in order to generate a subtracted image with reduced motion artifacts.

Figure 1:
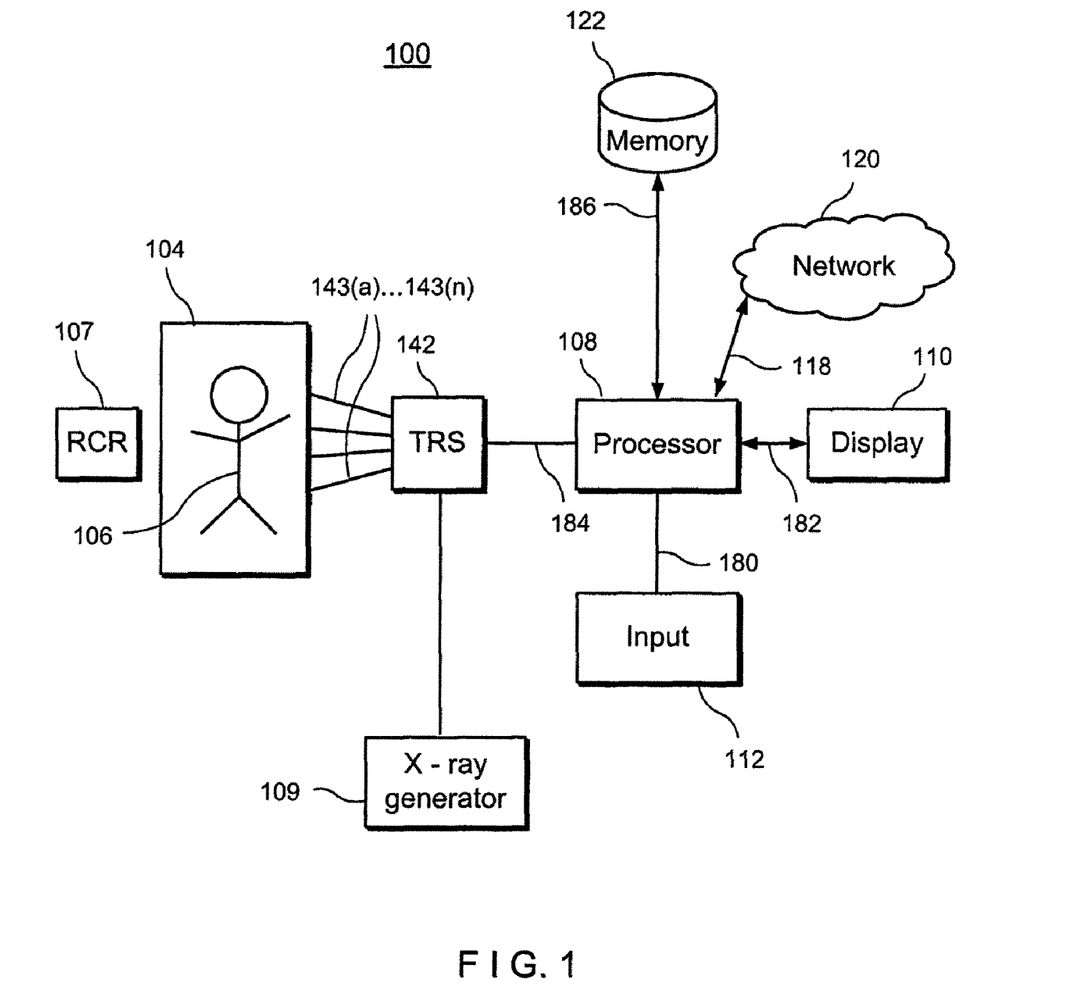
FIG. 1 shows a system that supports the present invention.

An embodiment of the invention, illustrated in FIG. 1, is a system 100 in which a patient 106 is placed on a table 104. A support member, such as a C-arm, supports an x-ray emitting unit, such as an x-ray tube, 142 and an x-ray detecting unit, such as an x-ray detector, 107. The x-ray emitting unit 142 is adapted to emit x-rays 143($a$) . . . ($n$) (identifying a plurality of x-rays), and the x-ray detecting unit 107 is adapted to absorb and measure the emitted x-rays. Images of all or parts of the patient 106 may be obtained by using the x-ray emitter 142, x-ray detector 107, and x-rays 143. The images typically assist in the diagnosis and/or treatment of the patient 106. In the case of road-mapping using digital subtraction angiography, the images assist an operator, typically a physician, in placing a catheter, wire, stent, or other medical device into a blood vessel of patient 106.

A generator unit 109 is used to generate the x-rays emitted by the x-ray emitting unit 142. The x-ray generator 109 is typically, for example, an x-ray producing device that includes a source of electrons, a vacuum within which the electrons are accelerated, and an energy source that causes the electrons to be accelerated.

A processor 108 controls the operation of the entire system 100, performs image processing, and transmits the image data for display on the image display unit 110. The display unit 110 is used to display the image data generated by the system 100. The display unit 110 may be, for example, a monitor, LCD (liquid crystal display), a plasma screen, or other module adapted to display output data typically by a representation of pixels. Processor 108 may have, for example, a processing speed of 10 GHz, a 1 TB hard drive, and 1 GB of SDRAM memory. Processor 108 stores information in memory unit 122 through bidirectional communication 186. Memory units, such as memory unit 122, may be one or more SDRAM modules, for example. Additional information may be input to processor 108 from input 112 through bidirectional communication 180. Bi-directional communication 184 communicates information from the detecting unit 107 to the processor 108. Image data to be displayed, usually a subtracted image, is communicated to display 110 through bidirectional communication 182 from processor 108. Processor 108 may also communicate with network 120 through bidirectional communication 118. The bi-directional communications may be, for example, IEEE 1394 bus, Ethernet, DVI connections, and/or USB connections, but are by no means limited to the connections disclosed here. The processor 108 is described in relation to FIG. 2 below.

Emitting unit 142 may be any device for generating x-rays or other suitable radiation; a fluoroscope is not necessary. Also, magnetic resonance for angiography, as opposed to x-rays generated by a fluoroscope, may also be used. Detecting unit 107 may be used in connection with a video camera, such as a CDC camera, for generating digital images. Any device capable of capturing images may be used. Digital images created in this manner are a form of dynamic image data, although dynamic image data may take other forms.

Figure 2:
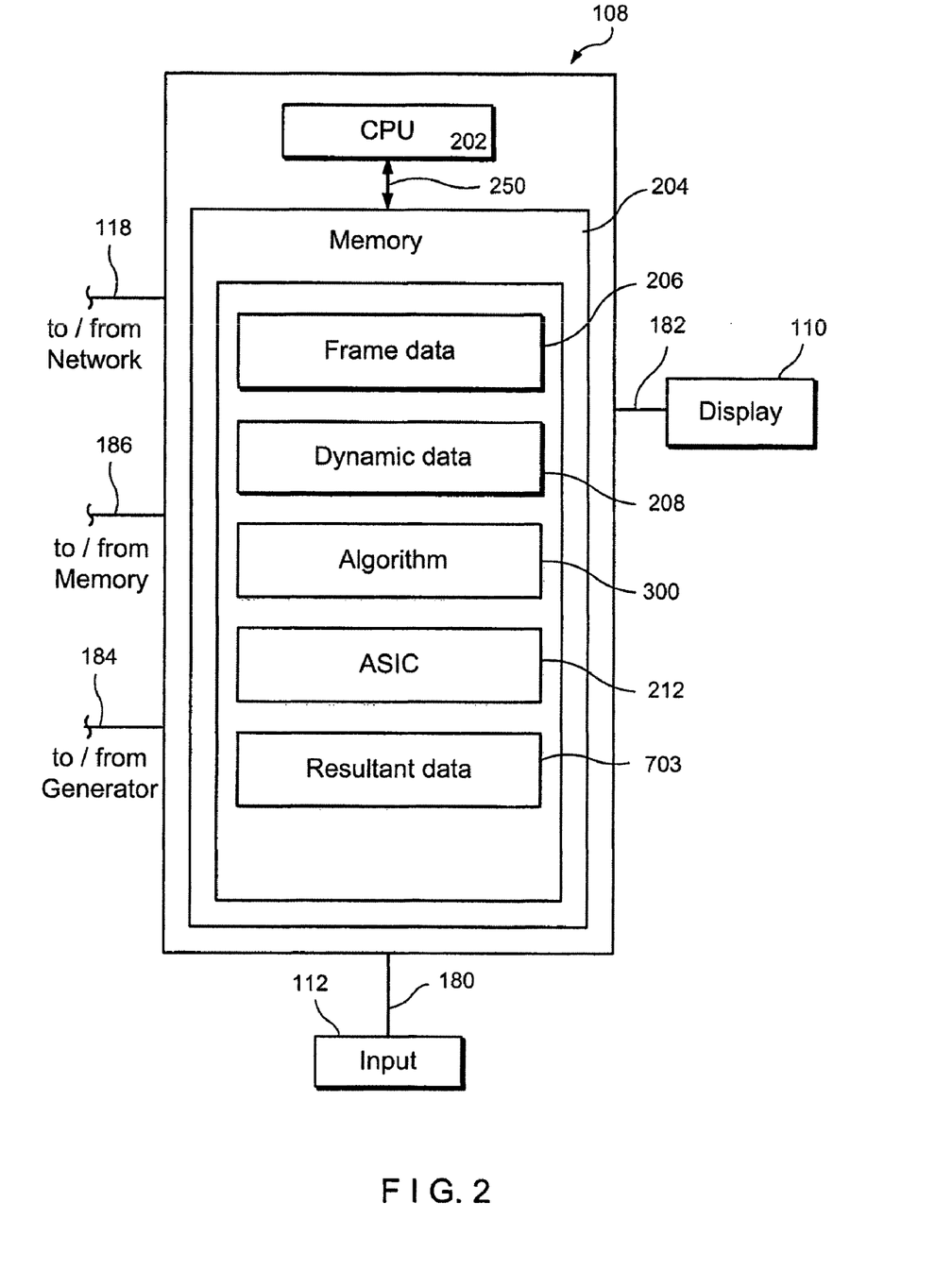
FIG. 2 illustrates an embodiment of the present invention including a processor.

FIG. 2 shows processor 108 having central processing unit (CPU) 202 and memory unit 204. Processor 108 is connected to a network via line 118, to a memory via line 186, to the detecting unit (shown in FIG. 1 as element 107) via line 184, to input module 112 via line 180 and to a display 110 via line 182. CPU 202 stores data to and retrieves data from memory unit 204 through bidirectional communication 250. Data communication between CPU 202 and memory unit 204 is controlled by an ASIC 212. Memory unit 204 is shown with reference image data, or frame data, 206, dynamic image data 208, algorithm 300, and resultant image 703 stored therein.

Reference image data 206 is, for example, a roadmap mask in a digital subtraction angiography. Dynamic image data 208, may be, for example, live image data captured by a video camera associated with a detecting unit during a digital subtraction angiography. Algorithm 300 is an algorithm for calculating a pixel-shift vector as a function of the reference image data 206 and the dynamic image data 208 stored in memory unit 204. Resultant image 703 is, for example, a subtracted image obtained from subtracting dynamic image data 208 from reference image data 206 during a digital subtracted angiography. The resultant image data 703 may be communicated to display 110 through bidirectional communication 182.

Figure 3:
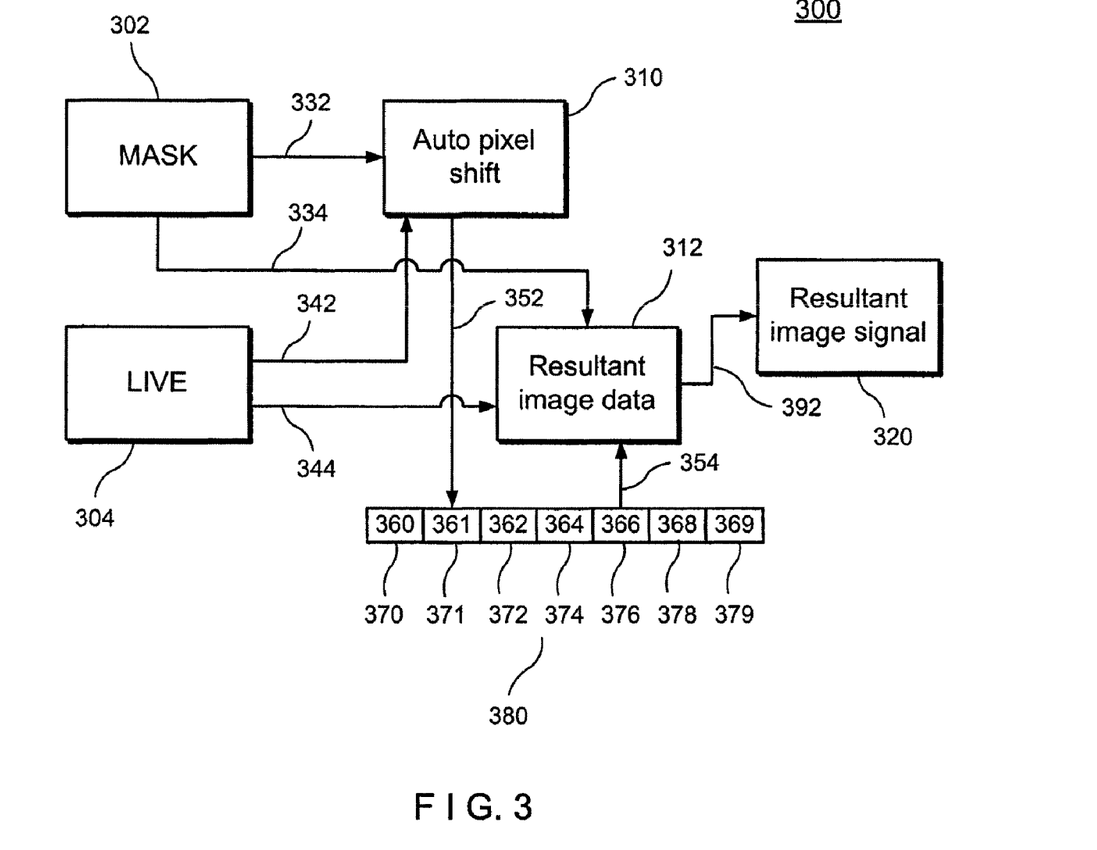
FIG. 3 illustrates an embodiment of the present invention.

FIG. 3 illustrates a system for adjusting reference image data based on a pixel shift vector determined as a function of previously calculated pixel-shift vector data. Reference image data, also referred to a mask data, 302 is accessed and provided as reference image data signal 332. The reference image data 302 could be a roadmap mask frame taken in preparation for a digital subtraction angiography procedure. The signal 332 could be a binary signal created from accessed reference image data 302 by an analogue-to-digital converter (ADC). Signal 332 is supplied to a module or facility for calculating an auto-pixel shift vector 310.

The term module, or facility as used herein, describes, for example, a set of program code (software or hardwired instructions) stored in a memory location, or memory such as EEPROM, PROM, DRAM, or other suitable electronic storage media. This memory, or storage media, may be disposed on an integrated circuit (IC) application specific IC (ASIC), chip or other location from which the functionality may be accessed by a processor. The module could be a discrete unit or a component of a system or algorithm.

The module for calculating an auto-pixel shift vector 310 is a set of instructions adapted to determine an auto-pixel shift vector.

Dynamic image data 304 is accessed. The dynamic image data 304 may be frames of live x-ray images captured by a video camera associated with a fluoroscope during an angiography or obtained from the detecting unit 107 shown in FIG. 1. An ADC could be used to sample the dynamic image data 304 and convert the sampled dynamic image data into a binary representation. The binary representation could be communicated as dynamic image data signal 342 to the module for calculating an auto-pixel shift vector 310.

A pixel-shift vector is calculated by module 310 as a function of the reference image data signal 332 and the dynamic image data signal 342. The pixel-shift vector can be expressed in binary and communicated as pixel-shift vector signal 352 to array 380. The pixel-shift vector signal 352 may be stored in a position 371 of array 180 as a stored pixel-shift vector 361. Other stored pixel-shift vectors include vectors 360, 362, 364, 366, 368, and 369, which may be stored in positions 370, 372, 374, 376, 378, and 379, respectively, of array 380.

A virtual, or predicted, pixel-shift vector 354 may be calculated as a function of the pixel-shift vectors stored in array 380. One example of motion prediction is to apply linear extrapolation to calculate a new value given known shift vectors V[a] and V[b] for times t=a and t=b, respectively. The value V[c] is calculated as follows: $m=(c-a)/(b-a)$, $V[c]=V[a]+m(V[b]-V[a])$. Alternative forms of interpolation or extrapolation, such as cubic extrapolation, may be used as deemed appropriate. Linear interpolation or extrapolation are provided as examples of interpolation or extrapolation that may be used.

The virtual pixel-shift vector 354 may be, for example, a prediction of the vector needed to align the stationary reference image data 302 with the moving dynamic image data 304. The virtual pixel-shift vector 354 may be communicated to the module for calculating resultant image data 312. Reference image data 334 is communicated to the module for calculating resultant image data 312. Second dynamic image data signal 344 is communicated to the module for calculating resultant image data 312. The second dynamic image data may be a current frame of the live video captured from a video camera associated with a fluoroscope during an angiography or supplied from the detecting unit 107 of FIG. 1. Second dynamic image data signal 344 may be a binary representation created by an ADC. The module for generating a resultant image 312 adjusts the position of reference image data 334 as a function of the virtual pixel-shift vector 354. The module for generating a resultant image 312 then subtracts second dynamic image data 344 from the reference image data 334 to generate an adjusted resultant image. The resultant image may be expressed in binary and communicated as resultant image signal 392 and stored as resultant image 320. In this way, the reference image data may be adjusted to overlap the predicted location of the current frame of live video captured from a video camera associated with a fluoroscope during an angiography.

Figure 4:
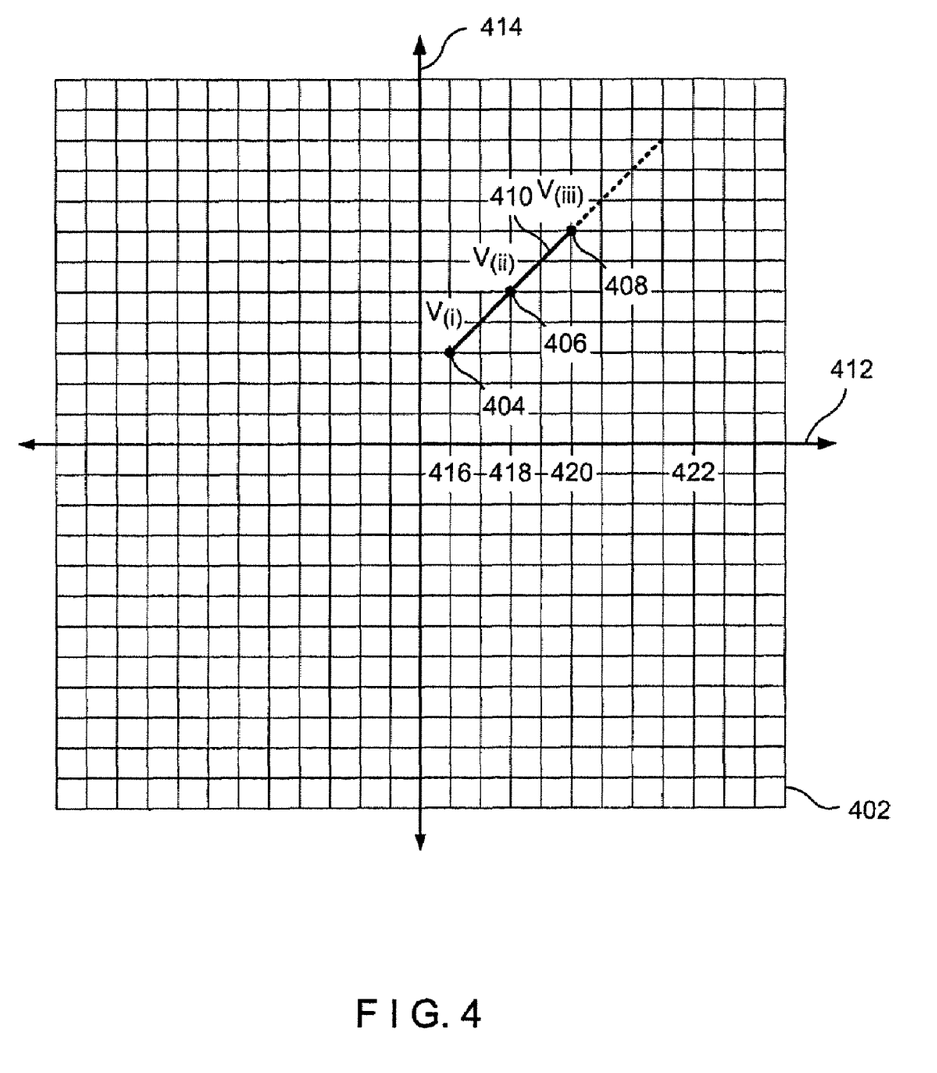
FIG. 4 illustrates a coordinate plane with three plotted vectors according to an embodiment of the present invention.

FIG. 4 shows a coordinate plane 402 with plotted vectors 404, 406, and 408. The x-axis 412 represents time and the y-axis 414 represents the magnitude of the vector. Vector 404 was calculated as a function of the reference image data and a frame of dynamic image data captured at a first time 416. Vector 406 was calculated as a function of the reference image data and a frame of dynamic image data captured at a second time 418.

A line 410 is plotted through vectors 404 and 406. The slope of the line 410 represents the rate of change in the magnitude of the vector. Virtual vector 408 is plotted along the line 410 at a future time 420. Virtual vector 408 is calculated, or predicted, for future time 420 based on the rate of change in the magnitude of two previously calculated vectors 404 and 406. Virtual vector 408 represents the virtual vector 354 of FIG. 3. Vector 404 and vector 406 represent the vectors stored in the array 380 in FIG. 3. FIG. 4 is provided to illustrate that the virtual vector is calculated for a future time, or the present time, based on two previously known vectors which have been calculated based on the actual shift of the live frame in the past. FIG. 4 shows a plot of a linear function, however, extrapolation is also possible using non-linear functions and such functions may be used as appropriate.

Figure 5:
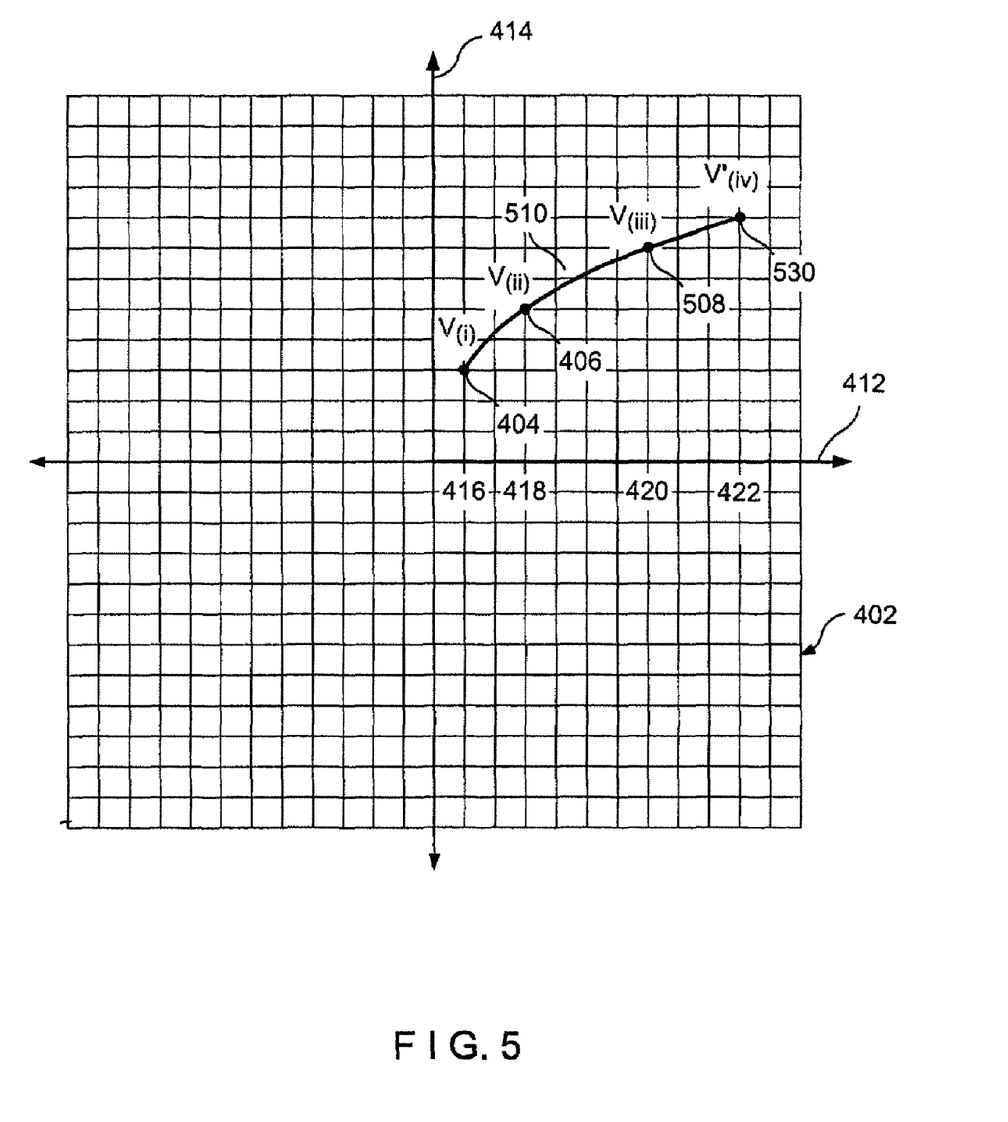
FIG. 5 illustrates a coordinate plane with four plotted vectors according to an embodiment of the present invention.

FIG. 5 shows a coordinate plane 402 with plotted vectors 404, 406, 508, and 530. The x-axis 412 represents time and the y-axis 414 represents the magnitude of the vector. Vector 404 was calculated as a function of the reference image data and a frame of dynamic image data captured at a first time 416. Vector 406 was calculated as a function of the reference image data and a frame of dynamic image data captured at a second time 418. Vector 508 was calculated as a function of the reference image data and a frame of dynamic image data captured at a third time 420. Vectors 404, 406, and 508 represent the vectors stored in the array 380 in FIG. 3. Time 420, when vector 508 was calculated, is the same time as the time for which vector 408 was predicted in FIG. 4.

FIG. 5 illustrates that virtual vectors are not required to be stored in arrays. This means that future virtual vectors are not calculated based on past virtual vectors, but rather only on actual, or measured, vectors. A comparison of FIGS. 4 and 5 shows the reason for not storing virtual vectors. In FIG. 4, vector 408 was predicted for time 420. In reality, vector 508 occurred at time 420. Vector 508 would then be stored in array 380 in FIG. 3. Virtual vector 530 would then be predicted for time 422. If the virtual vector 530 for time 422 were calculated based on the slope of the line 410 in FIG. 4, the predicted vector would occur in a different location on the coordinate plane than the virtual vector 530 in FIG. 5 because the lines have changed slopes based on new information. Storing virtual vectors in array 380 of FIG. 3 and using the previously calculated virtual vectors to calculate current or future virtual vectors would create less accurate predictions when the predicted vector(s) fail to coincide with the actual vector(s), or measured, vector(s).

Figure 6:
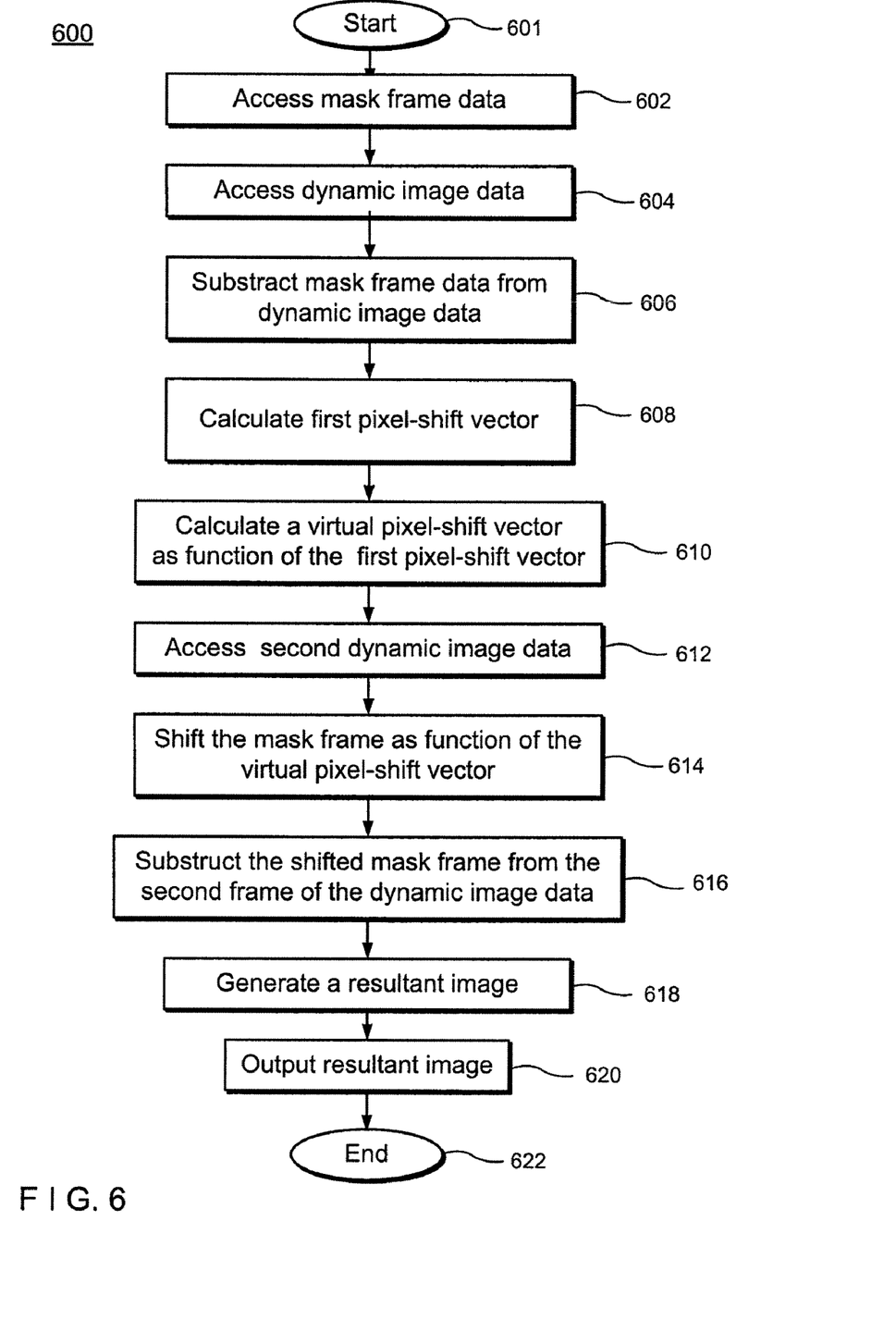
FIG. 6 illustrates an example of a method of using the auto pixel-shift vector calculation of the present invention.

FIG. 6 shows a method 600 to calculate a pixel-shift vector with motion prediction for digital subtraction angiography. This method 600 is typically a series of steps, or an algorithm, that may be stored in an electronic memory medium, such as found in processor 108 shown in FIG. 1. The method begins with step 601. Mask frame data is accessed, as shown in step 602. The mask frame may be a roadmap mask as is commonly used in digital subtraction angiography. Dynamic image data is accessed, as shown in step 604. The dynamic image data may be one or more frames of a live x-ray image provided by a video camera associated with a fluoroscope during digital subtraction angiography. Dynamic image data is subtracted from the mask frame data, as shown in step 606. The subtraction step is used to calculate a first pixel-shift vector, as shown in step 608. A virtual pixel-shift vector is calculated as a function of the first pixel-shift vector, as shown in step 610. Second dynamic image data is accessed, as shown in step 612. Second dynamic image data may be a frame of a live x-ray image provided by a video camera associated with a fluoroscope during digital subtraction angiography. The mask frame data is then shifted as a function of the virtual pixel-shift vector, as shown in step 614. The second dynamic image data is then subtracted from the shifted mask frame data, as shown in step 616. This subtraction generates a resultant image, as shown in step 618. The resultant image may be a subtracted image, as is commonly used in digital subtraction angiography. The resultant image may then be output, as shown in FIG. 620. The output may take the form of display on an LCD display or CRT monitor, as is common in digital subtraction angiography. The resultant image data may be transmitted to another location, stored in a memory (local or remote), printed and/or displayed. The method ends, as shown in step 622.

Figure 7A:
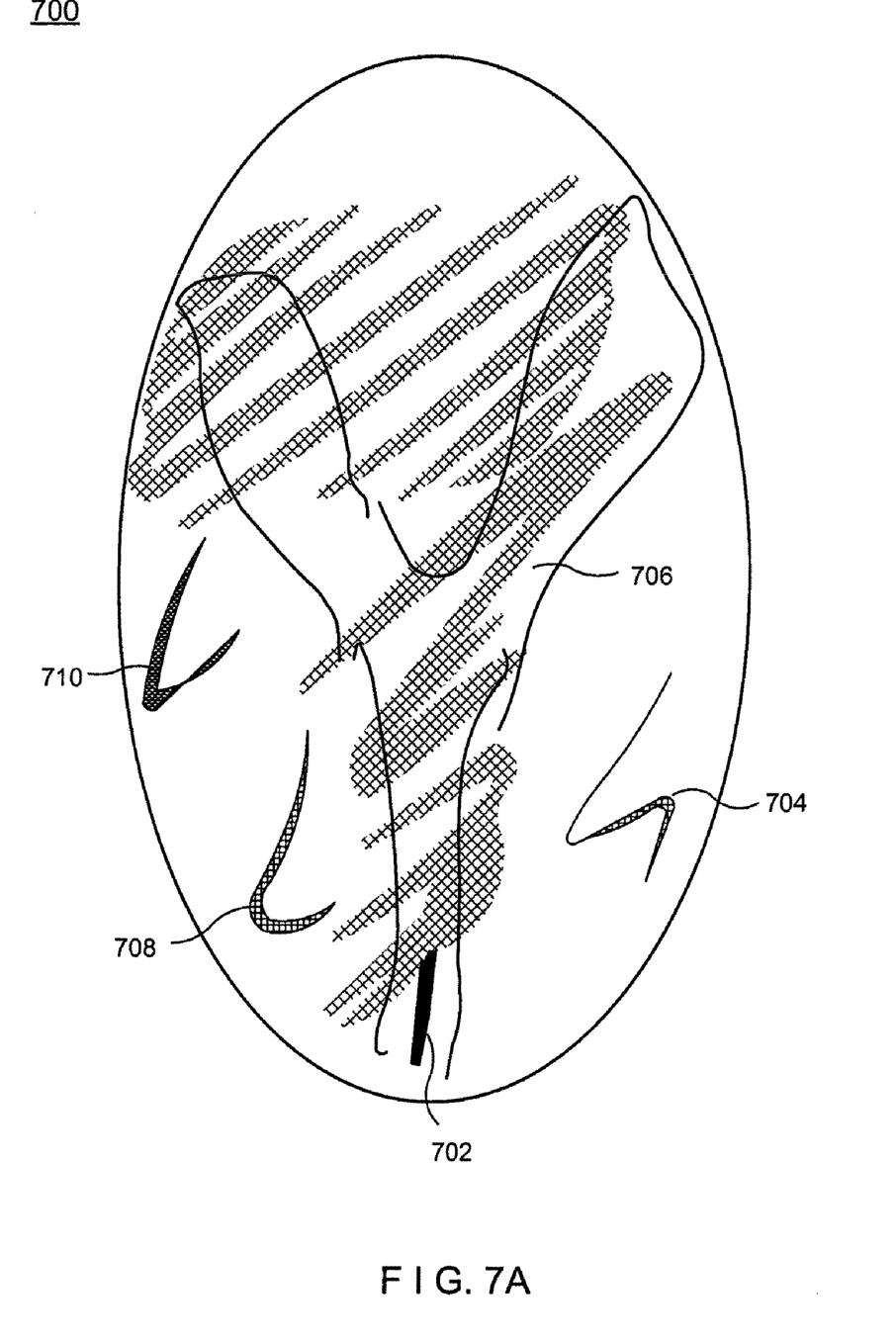
FIG. 7a shows a roadmap mask frame according to an embodiment of the present invention.
Figure 7B:
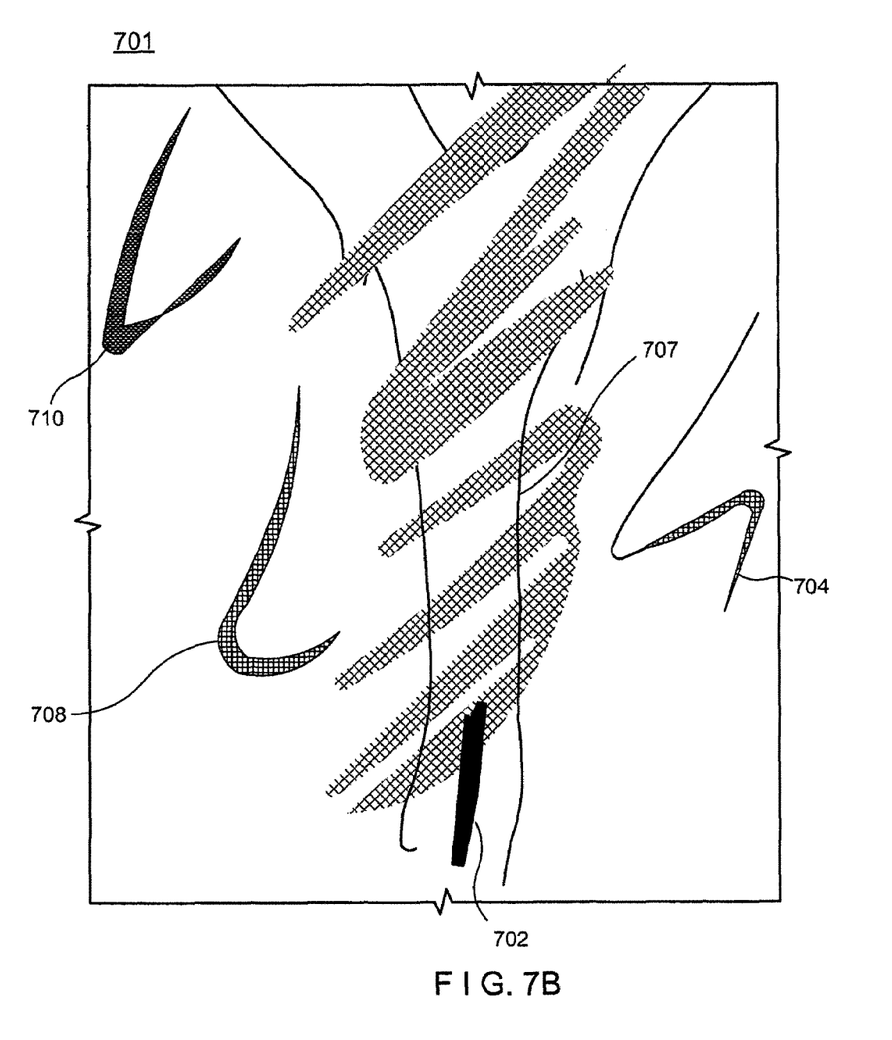
FIG. 7b shows a frame of dynamic image data according to an embodiment of the present invention.
Figure 7C:
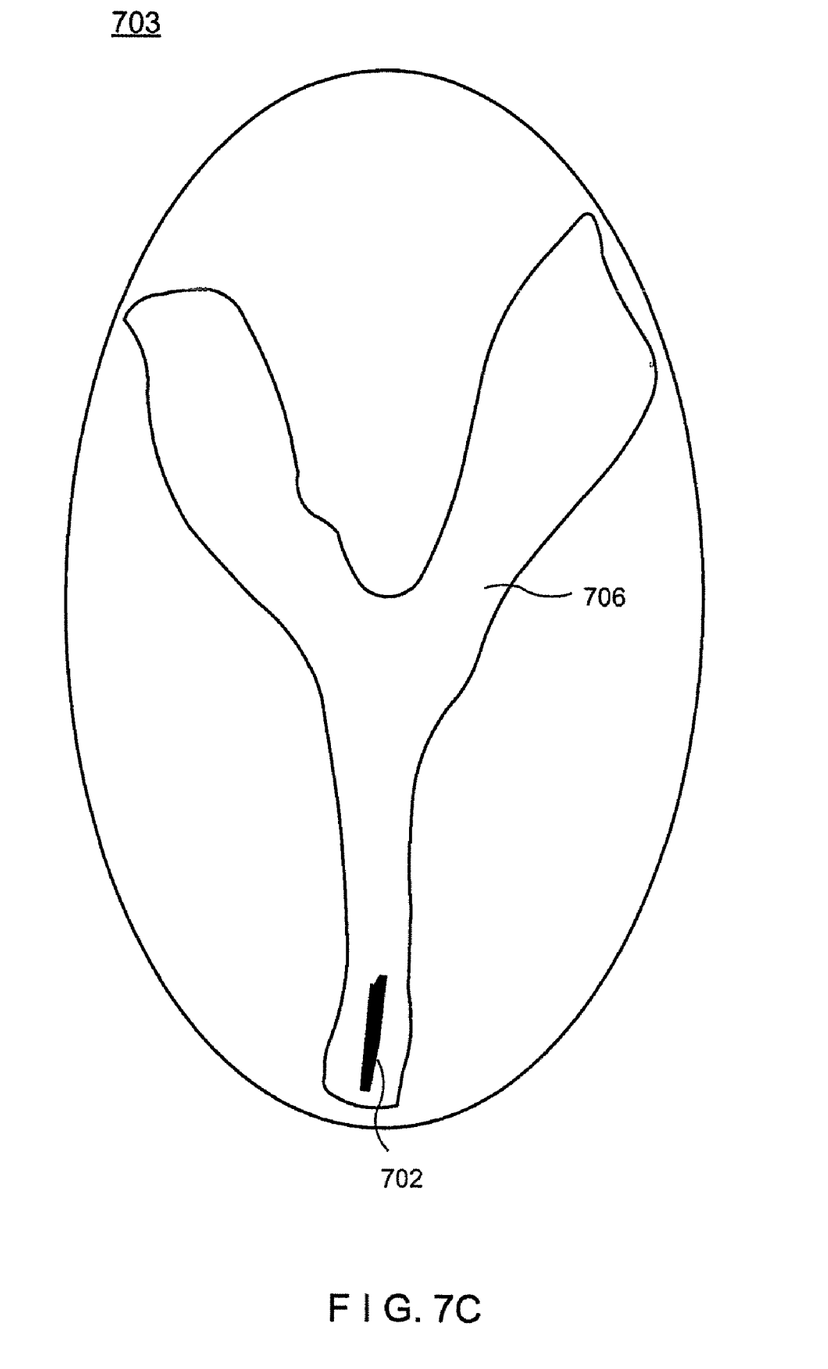
FIG. 7c shows a subtracted image with image artifacts reduced according to an embodiment of the present invention.

FIGS. 7a, 7b, and 7c illustrate a mode of operation of the present invention, and are not intended to limit the scope or spirit of the invention in any way. FIG. 7a shows reference image data in the form of a roadmap mask 700 as is common in digital subtraction angiography. Distracting bodily structures 704, 708, and 710 may hinder the physician's view as the he or she performs the procedure. Catheter 702 is being inserted into blood vessel 706. Blood vessel 706 has previously been injected with a contrast material and stands out boldly in white against the darker background of the distracting bodily structures 704, 708, and 710. The roadmap mask is typically a still image taken at a point during which the contrast material has created maximal contrast between the blood vessel 706 and the distracting bodily structures 704, 708, and 710. The roadmap mask 700 may also be a still image made by compiling a series of images showing high contrast in different areas of the blood vessel 706 over time.

FIG. 7b shows dynamic image data in the form of a frame of live x-ray image data 701 obtained from a video camera associated with a fluoroscope during a digital subtraction angiography. Distracting bodily structures 704, 708, and 710 are visible, as is the catheter 702. However, due to a lack of contrast material, a portion of the blood vessel 707 (the blood vessel is shown in FIG. 7a as element 706) is not clearly visible. The blood vessel cannot be made visible during the operation because the contrast material disperses through the blood vessel (FIG. 7a element 706) after injection. This makes it difficult for the physician to guide the catheter 702 through the blood vessel since the blood vessel is difficult, or impossible, to visualize.

FIG. 7c shows a resultant image in the form of a subtracted image 703. Subtracted image 703 was obtained by digitally subtracting dynamic image data 701 from roadmap mask 700, according to the methods described in the present invention. Blood vessel 706 and catheter 702 are both clearly visible, while the distracting bodily structures are removed from the image. This allows the physician to see a roadmap of the blood vessel while he or she attempts to guide the catheter 702 through the blood vessel.

As the patient, equipment, and/or physician move, the catheter, blood vessel, and distracting bodily structures move independently of the roadmap. This independent motion creates artifacts in the image, which confuses the physician. These artifacts blur and distort the image, making it difficult for the physician to precisely maneuver the catheter through the blood vessel. Previous attempts to reduce motion artifacts have shifted the roadmap using a pixel-shift vector calculated based on previously captured frames of the live x-ray image. This, of course, results in moving the roadmap to where the live image used to be; not to where the live image is currently going. The present invention calculates a virtual pixel-shift vector based on previously calculated pixel-shift vectors. The previously calculated pixel-shift vectors were determined as a function of previously captured frames of the live x-ray image. The virtual pixel-shift vector is then applied to the roadmap image in order to move the roadmap image to the location where the current live frame of the x-ray image data is predicted to be based on its prior motion. In this way, the present invention layers the roadmap on top of where the current live frame of the x-ray image is predicted to be, instead of attempting to move the roadmap to where the previous frames of live x-ray image were. Therefore, images created according to the present invention are more accurate, reliable because they have less image artifacts and higher contrast.

The preceding example is illustrative of the result of applying the present invention to digital subtraction angiography, and is not intended to limit the scope or spirit of the present invention. It will be appreciated from the above that the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method, comprising:
accessing reference image data;
accessing first dynamic image data;
determining first pixel-shift vector data indicating a shift amount and shift direction, as a function of the reference image data and the first dynamic image data;
accessing second dynamic image data;
determining second pixel-shift vector data indicating a shift amount and shift direction, as a function of the reference image data and the second dynamic image data;
determining third pixel-shift vector data as a function exclusively of the first pixel-shift vector data and the second pixel-shift vector data;
adjusting the reference image data as a function of the third pixel-shift vector data;
accessing third dynamic image data;
subtracting the adjusted reference image data from the third dynamic image data; and
generating resultant image data as a function of the subtracting step.

2. The method according to claim 1, further comprising:
determining third pixel-shift vector data by interpolation between first pixel-shift vector data and the second pixel-shift vector data and
storing the resultant image data.

3. The method according to claim 1, further comprising:
displaying the resultant image data.

4. The method according to claim 1, further comprising:
determining the first pixel-shift vector data at a predetermined frame rate of the first dynamic image data.

5. The method according to claim 1, further comprising:
adjusting the reference image data as a function of the second pixel shift vector data when the second pixel-shift vector data is known at the time the third dynamic image data is accessed.

6. The method according to claim 1,
wherein the reference image data is a first frame of data; and
wherein the first dynamic image data is a subsequent frame of data.

7. The method according to claim 1, wherein the reference image data is a mask frame.

8. A method, comprising:
accessing reference image data;
accessing first and second dynamic image data;
determining first pixel-shift vector data indicating a shift amount and shift direction, as a function of the reference image data and the first dynamic image data;
determining second pixel-shift vector data indicating a shift amount and shift direction, as a function of the reference image data and the second dynamic image data;
determining third pixel-shift vector data by interpolation between first pixel-shift vector data and the second pixel-shift vector data; and
adjusting the reference image data as a function of the third pixel-shift vector data.

9. The method according to claim 8, further comprising:
calculating said third pixel-shift vector data as a function exclusively of the first and second pixel-shift vector data;
accessing second dynamic image data;
subtracting the adjusted reference image data from the second dynamic image data; and
generating resultant image data as a function of the subtracting step.

10. The method according to claim 9, further comprising:
determining the first pixel-shift vector data at a predetermined frame rate of dynamic image data; and
determining the second pixel-shift vector data at a predetermined frame rate of dynamic image data.

11. A method, comprising:
accessing a reference frame;
accessing dynamic frame data;
calculating first pixel-shift vector data indicating a shift amount and shift direction, as a function of the reference frame and the dynamic frame data;
calculating second pixel-shift vector data indicating a shift amount and shift direction, as a function of the reference frame and the dynamic frame data;

calculating virtual pixel-shift vector data as a function exclusively of the first and second pixel-shift vector data;

shifting the reference frame as a function of the virtual pixel-shift vector data;

accessing second dynamic frame data;

subtracting the second dynamic frame data from the shifted reference frame; and generating resultant image data as a function of the subtracting step.

12. The method according to claim 11, further comprising:
determining virtual pixel-shift vector data by interpolation between first pixel-shift vector data and the second pixel-shift vector data and storing the pixel-shift vector data.

13. The method according to claim 12, wherein the pixel-shift vector data is stored in an array.

14. The method according to claim 11, further comprising:
determining the first pixel-shift vector data at a predetermined frame rate of dynamic image data.

15. The method according to claim 11, further comprising:
storing the resultant image data.

16. The method according to claim 11, further comprising:
displaying the resultant image data.

17. An apparatus implemented using at least one processor, comprising:
means for accessing reference image data;
means for accessing first dynamic image data;
means for determining first pixel-shift vector data indicating a shift amount and shift direction, as a function of the reference image data and the first dynamic image data;
means for accessing second dynamic image data;
means for determining second pixel-shift vector data indicating a shift amount and shift direction, as a function of the reference image data and the second dynamic image data;
means for determining third pixel-shift vector data as a function exclusively of the first pixel-shift vector data and the second pixel-shift vector data;
means for adjusting the reference image data as a function of the third pixel-shift vector data;
means for accessing third dynamic image data;
means for subtracting the adjusted reference image data from the third dynamic image data; and
means for generating resultant image data as a function of the subtracting step.

18. The apparatus according to claim 17, further comprising:
means for storing the resultant image data.

19. The apparatus according to claim 17, further comprising:
means for determining the first pixel-shift vector data at a predetermined frame rate of the first dynamic image data.

20. The apparatus according to claim 17, further comprising:
means for adjusting the reference image data as a function of the second pixel shift vector data when the second pixel-shift vector data is known at the time the third dynamic image data is accessed.

21. The apparatus according to claim 17,
wherein the reference image data is a first frame of data; and
wherein the first dynamic image data is a subsequent frame of data.

22. The apparatus according to claim 17,
wherein the reference image data is a mask frame.

23. An apparatus implemented using at least one processor, comprising:
means for accessing reference image data;
means for accessing first and second dynamic image data;
means for determining first pixel-shift vector data indicating a shift amount and shift direction, as a function of the reference image data and the first dynamic image data;
means for determining second pixel-shift vector data indicating a shift amount and shift direction, as a function of the reference image data and the second dynamic image data;
means for determining third pixel-shift vector data by interpolation between the first pixel-shift vector data and the second pixel-shift vector data; and
means for adjusting the reference image data as a function of the third pixel-shift vector data.

24. An apparatus implemented using at least one processor, comprising:
means for accessing a reference frame;
means for accessing dynamic frame data;
means for calculating first pixel-shift vector data indicating a shift amount and shift direction, as a function of the reference frame and the dynamic frame data;
means for calculating second pixel-shift vector data indicating a shift amount and shift direction, as a function of the reference frame and the dynamic frame data;
means for calculating virtual pixel-shift vector data as a function exclusively of the first and second pixel-shift vector data;
means for shifting the reference frame as a function of the virtual pixel-shift vector data;
means for accessing second dynamic frame data;
means for subtracting the second dynamic frame data from the shifted reference frame; and
means for generating resultant image data as a function of the subtracting step.

25. A system, comprising:
at least one processor; and
at least one memory, coupled to the at least one processor, storing program code adapted to cause the at least one processor to
access reference image data;
access first dynamic image data;
determine first pixel-shift vector data indicating a shift amount and shift direction, as a function of the reference image data and the first dynamic image data;
access second dynamic image data;
determine second pixel-shift vector data indicating a shift amount and shift direction, as a function of the reference image data and the second dynamic image data;
determine third pixel-shift vector data as a function exclusively of the first pixel-shift vector data and the second pixel-shift vector data;
adjust the reference image data as a function of the third pixel-shift vector data;
access third dynamic image data;
subtract the adjusted reference image data from the third dynamic image data; and
generate resultant image data as a function of the subtracting step.

26. A system, comprising:
at least one processor; and
at least one memory, coupled to the at least one processor, storing program code adapted to cause the at least one processor to:
access a reference frame;

access dynamic frame data;

calculate first pixel-shift vector data indicating a shift amount and shift direction, as a function of the reference frame and the dynamic frame data;

calculate second pixel-shift vector data indicating a shift amount and shift direction, as a function of reference image data and the second dynamic image data;

calculate virtual pixel-shift vector data as a function exclusively of the first and second pixel-shift vector data;

shift the reference frame as a function of the virtual pixel-shift vector data;

access second dynamic frame data;

subtract the second dynamic frame data from the shifted reference frame; and generate resultant image data as a function of the subtracting step.

* * * * *